(12) United States Patent
MacKinnon et al.

(10) Patent No.: US 8,574,481 B2
(45) Date of Patent: *Nov. 5, 2013

(54) PROCESS AND APPARATUS FOR MOLDING A SHINGLE, FOR COOLING A SHINGLE, FOR APPLYING A CURVATURE THERETO AND CARRIER PLATE FOR FACILITATING THE PROCESS

(75) Inventors: Thomas Kevin MacKinnon, Ann Arbor, MI (US); Douglas Harold Wylie, Ontario (CA); David George Nelson, Ontario (CA); William Arno Koegler, Ontario (CA)

(73) Assignee: CertainTeed Corporation, Valley Forge, PA (US)

( * ) Notice: Subject to any disclaimer, the term of this patent is extended or adjusted under 35 U.S.C. 154(b) by 569 days.

This patent is subject to a terminal disclaimer.

(21) Appl. No.: 11/994,445

(22) PCT Filed: Nov. 29, 2007

(86) PCT No.: PCT/US2007/085900
§ 371 (c)(1),
(2), (4) Date: Jun. 23, 2010

(87) PCT Pub. No.: WO2009/023038
PCT Pub. Date: Feb. 19, 2009

(65) Prior Publication Data
US 2010/0252956 A1    Oct. 7, 2010

Related U.S. Application Data

(60) Provisional application No. 60/955,051, filed on Aug. 10, 2007.

(51) Int. Cl.
*B29C 43/34* (2006.01)

(52) U.S. Cl.
USPC .............. 264/297.3; 264/299; 264/320

(58) Field of Classification Search
USPC .................. 264/297.3, 299, 320
See application file for complete search history.

(56) References Cited

U.S. PATENT DOCUMENTS

| 1,627,266 A | 5/1927 | Beale |
| 2,086,794 A | 7/1937 | Fradette |
| 4,289,560 A | 9/1981 | Simons |
| 4,426,344 A | 1/1984 | Dinter et al. |
| 4,465,449 A | 8/1984 | Hornbeck |
| 4,499,041 A | 2/1985 | Hahn et al. |

(Continued)

*Primary Examiner* — James Sanders
(74) *Attorney, Agent, or Firm* — Paul & Paul

(57) ABSTRACT

Shingle material, preferably comprising a core with a capstock applied thereto is extruded, preferably by means of a co-extrusion process, onto a series of individual carrier plates, with the shingle material then being severed such that each carrier plate carries its own layer of shingle material thereon and the carrier plates are then delivered to a compression mold, in which the shingle is molded. The carrier plate and shingle is then removed from the mold and carried through a series of hold-down stations, after which the shingle is delivered to a trimmer, where flashing is simultaneously trimmed from its edges. The shingle is then cooled, preferably by sandwiching it between upper and lower retention members, which are cooled via a cooling tower. The retention members impart a curvature to the shingle. The carrier plates are returned via a return conveyor, to be heated, for re-use. Each carrier plate is preferably configured to have a reciprocal surface configuration for the under side of a shingle for providing a surface mold therefor.

25 Claims, 16 Drawing Sheets

(56) References Cited

U.S. PATENT DOCUMENTS

| | | |
|---|---|---|
| 4,832,589 A | 5/1989 | Gini et al. |
| 5,012,944 A | 5/1991 | Scheurenbrand et al. |
| 6,703,440 B2 | 3/2004 | Edson |
| 6,706,366 B2 | 3/2004 | Meyer et al. |
| 6,900,547 B2 * | 5/2005 | Polk, Jr. et al. ............... 257/777 |
| 2002/0098256 A1 * | 7/2002 | Polk, Jr. ......................... 425/258 |
| 2006/0029775 A1 | 2/2006 | MacKinnon et al. |

* cited by examiner

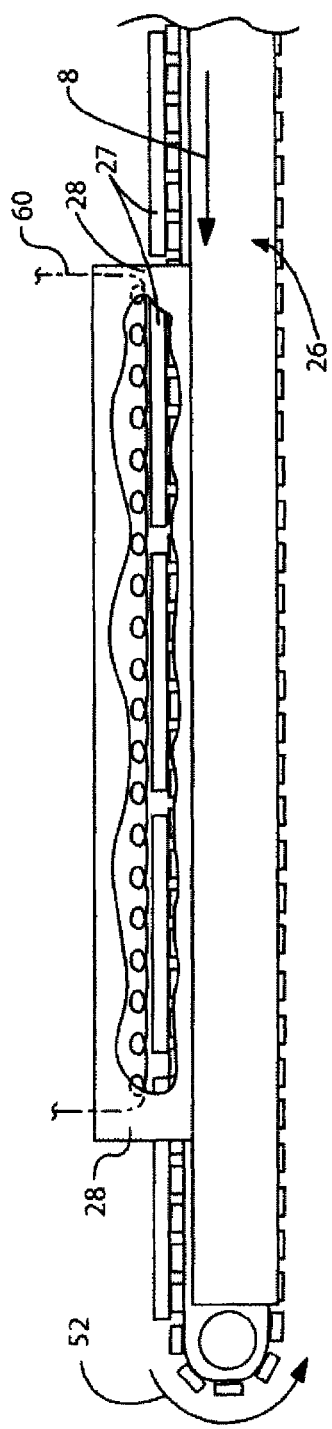
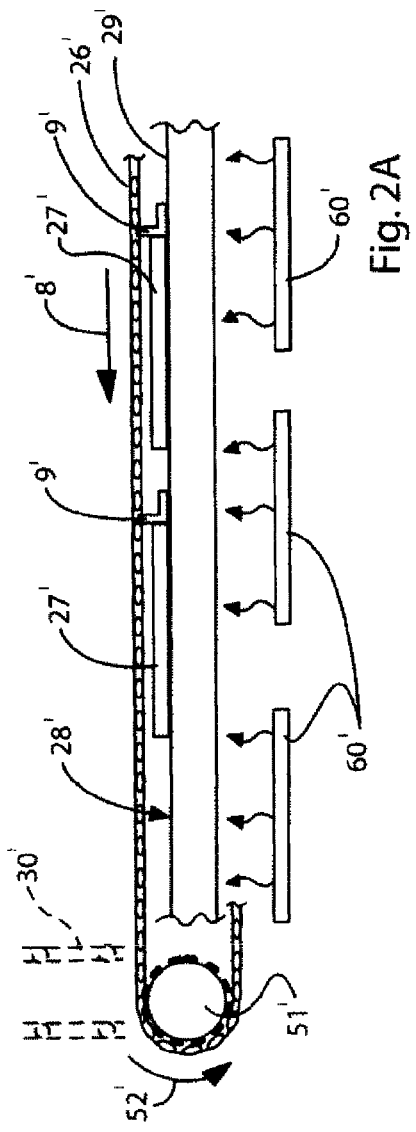
Fig. 2
Fig. 2A

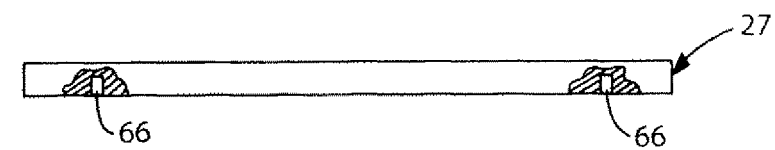
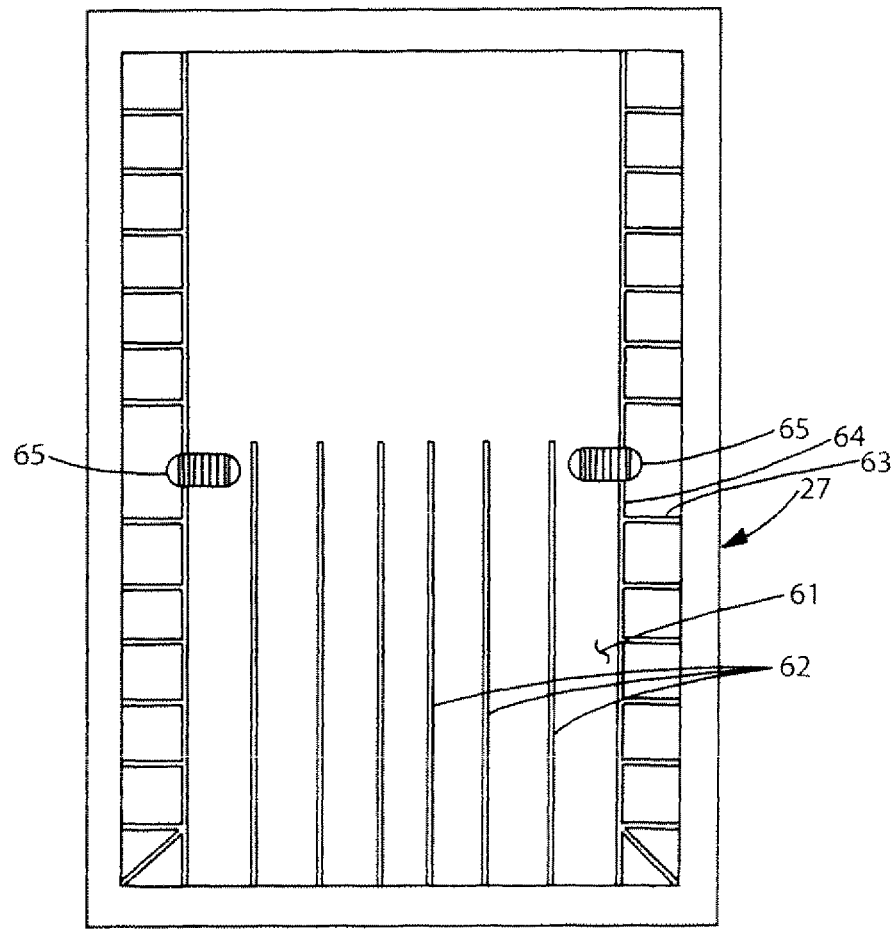

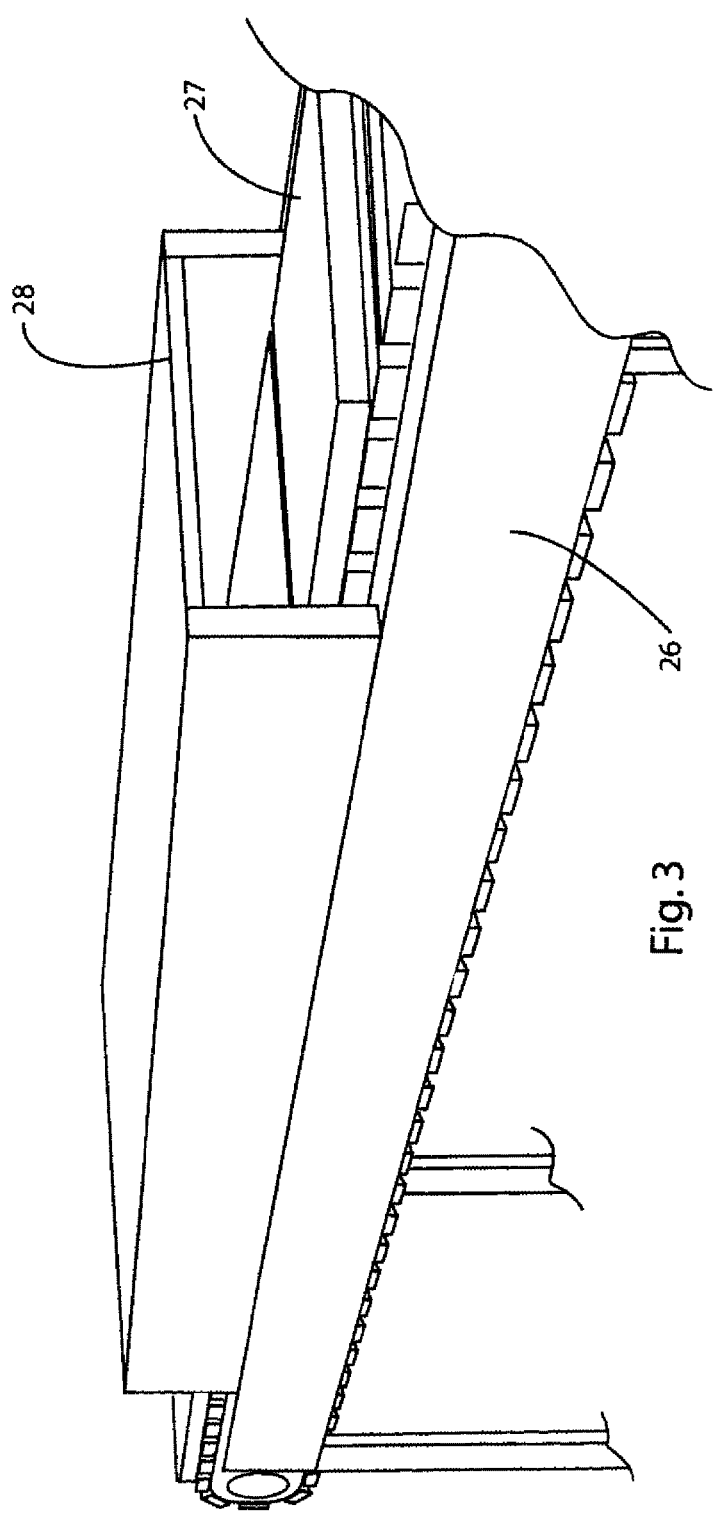

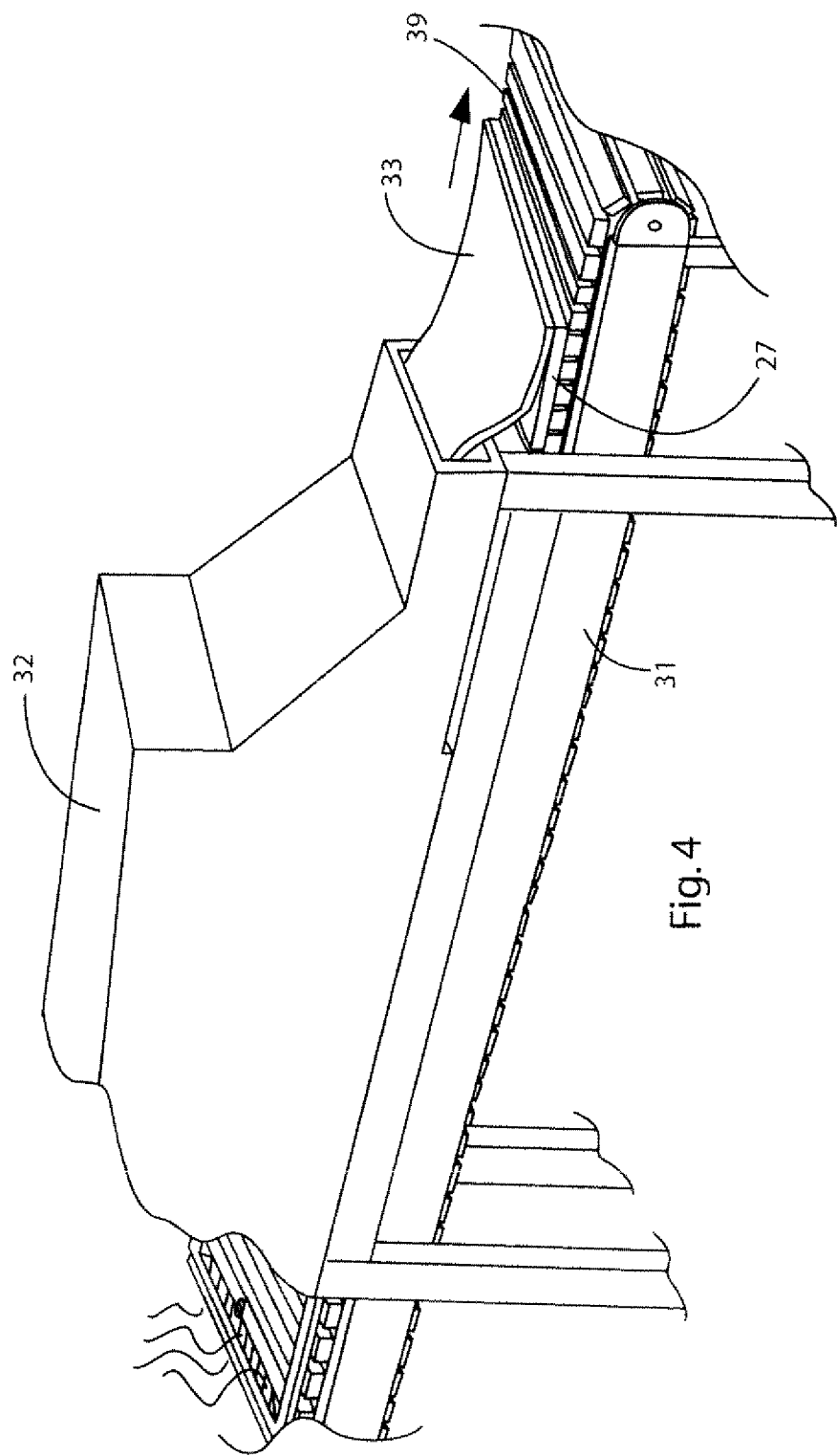

PROCESS AND APPARATUS FOR MOLDING A SHINGLE, FOR COOLING A SHINGLE, FOR APPLYING A CURVATURE THERETO AND CARRIER PLATE FOR FACILITATING THE PROCESS

BACKGROUND OF THE INVENTION

In the art of shingle manufacture, it is known to produce shingles of natural materials, such as slate, cedar shakes, and tiles, all for use on roofs, to give a rich, highly aesthetic appearance to the roofs of homes or other buildings.

Generally, the use of natural materials has become very expensive. Additionally, the use of natural materials in many instances, such as slate shingles or tiles, can greatly increase the weight applied to a roof, often requiring additional support for the roof, which again can increase the expense of a roof.

Accordingly, there has developed the use of synthetic materials which can be molded or otherwise formed, to give the appearance of natural materials, but which can be lighter in weight than the natural materials they are designed to simulate.

In some such developments, such as in U.S. Patent Publication No. 2006/0029775, the complete disclosure of which is herein incorporated by reference, short cycle molding techniques are addressed, for shortening molding time.

SUMMARY OF INVENTION

A process and apparatus is provided for molding a shingle, for cooling a shingle, and for applying a curvature thereto. A carrier plate is also provided for facilitating the process.

Shingle material preferably comprising a core material and a capstock material is extruded onto a series of carrier plates, which, preferably, have been pre-heated. The shingle material is severed between each carrier plate, and the carrier plates with the shingle material are then delivered to a compression mold so that the entire process is of the short cycle type, wherein the configuration that is desired is molded into the shingle material. The shingle thus formed is separated from the carrier plate and placed on a secondary plate, where flashing remaining from the molding operation is cut away. The shingles thus formed are delivered to a cooling zone. In the cooling zone a curvature is optionally provided to the shingles, preferably by means of sandwiching the shingle between upper and lower plate components of a retention mechanism as the cooling of the shingle takes place, preferably in a cooling tower. Various techniques for cooling the shingle between the sandwiching components are provided.

The resultant cooled shingle with the curvature thereon is then adapted to be fastened to a roof.

Because the shingle material is still somewhat soft when it is being molded in the compression mold, by using a carrier plate to carry such material while it is in the compression mold, the duration of the shingle material in the compression mold may be shortened. Additionally, by having a surface configuration to the carrier plate that is the reciprocal of the surface configuration of the shingle, it is not necessary that the mold itself have a supporting surface beneath the shingle that is being molded, that is a reciprocal surface configuration for the adjacent surface of the roofing shingle. Thus, the carrier plate becomes the bottom of the mold during compression molding. The carrier plate also allows for automation and handling of the part.

It is an object of the present invention to provide a process and apparatus for molding a shingle.

It is another object of this invention to accomplish the above object, wherein the molding is done in such a way such that the actual molding cycle is short.

It is yet another object of this invention to accomplish the above objects, wherein the shingle is compression molded.

It is yet another object of this invention to accomplish the above objects, wherein the shingle is of multiple layer construction.

It is a further object of this invention to provide a carrier plate for receiving once-molten, but as yet unhardened shingle material thereon, for supporting the shingle material during the compression molding thereof.

It is another object of this invention to accomplish the above object, so as to reduce the molding time for the shingle in a compression mold.

It is a further object of this invention to follow the shingle molding step with a cutting operation, for cutting flashing from a compression molded shingle.

It is another object of this invention to provide a novel method and apparatus for cooling a molded shingle.

It is a further object of this invention to accomplish the above object by providing a cooling method and apparatus for simultaneously cooling a plurality of molded shingles.

It is yet another object of this invention to provide a method and apparatus for applying a curvature to shingles as they are cooling, following the molding thereof.

It is a further object of this invention to accomplish the above object, wherein the molded shingles are shaped to a predetermined curvature; namely, by pressing/molding.

It is another object of this invention to accomplish the above object, with means and apparatus for simultaneously cooling the shingle.

Other objects and advantages of the present invention will be readily apparent from a reading of the following brief descriptions of the drawing figures, the detailed descriptions of the preferred embodiments, and the appended claims.

BRIEF DESCRIPTIONS OF THE DRAWING FIGURES

FIG. 2 is a schematic side elevational view of a preheater for preheating carrier plates being delivered along a conveyor, for return to an extruder at the left end of FIG. 1, for receiving extruded shingles thereon, with a portion of the preheater being broken away to illustrate a heating element therein.

FIG. 2A is a view somewhat similar to that of FIG. 2, but of an alternative embodiment of a preheater.

FIG. 2B is a top view of a carrier plate for receiving extruded shingle material thereon, for carrying the shingle material to and during a compression molding of the shingle material into a shingle.

FIG. 2C is a side elevational view of the carrier plate of FIG. 2B, with portions broken away and illustrated in section, to illustrate positioning holes for receiving positioning pins therein for aligning each carrier plate in a compression mold.

FIG. 3 is a side perspective view of the return conveyor and preheater of FIG. 2, with the right portion of the return conveyor being shown broken away.

FIG. 4 is a side perspective view of the extruder for extruding shingle-forming material and applying the same onto carrier plates that are delivered along a conveyor, fragmentally illustrating a portion of the left end of FIG. 1.

Figure 1:
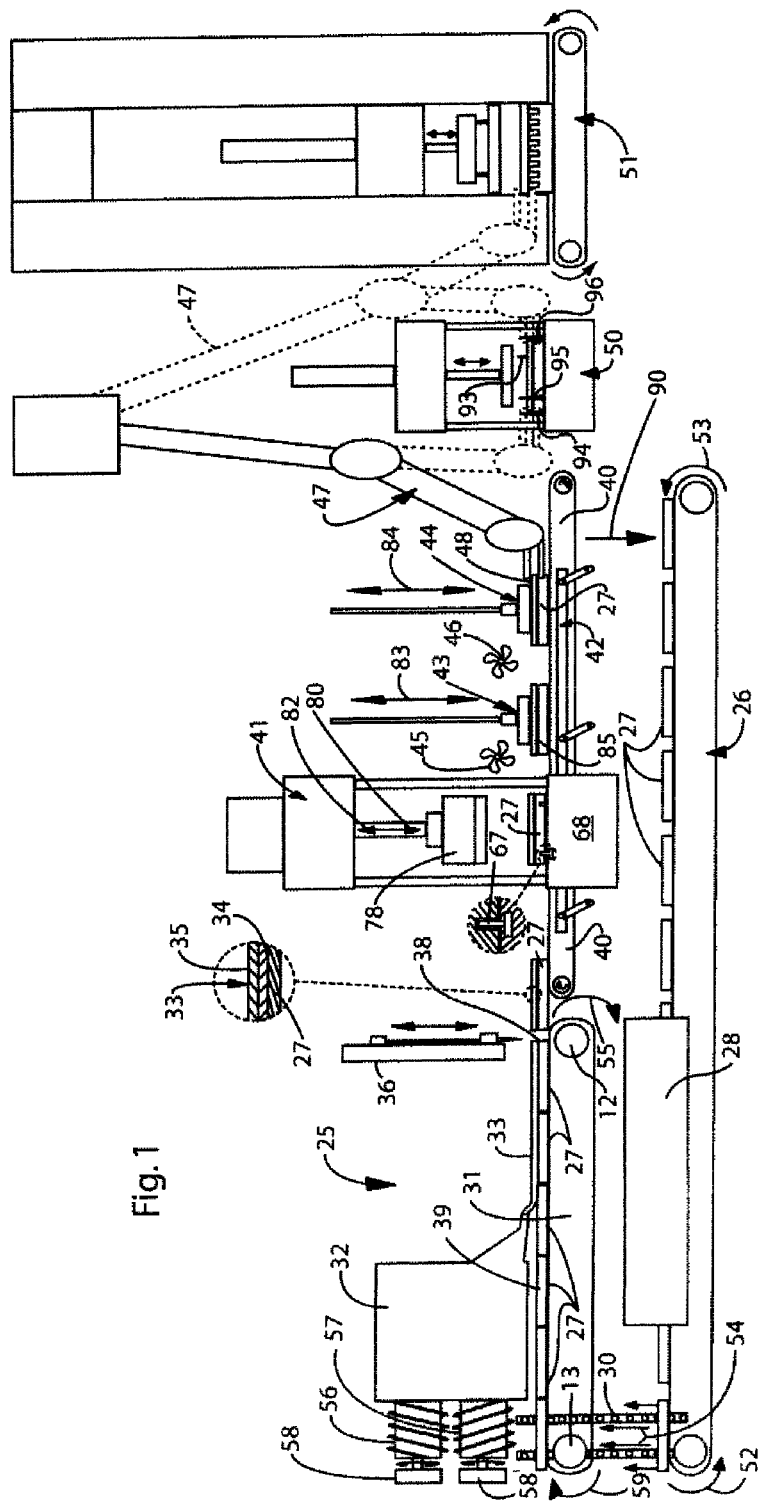
FIG. 1 is a schematic, side elevational view of an apparatus for practicing the method of this invention.
Figure 8:
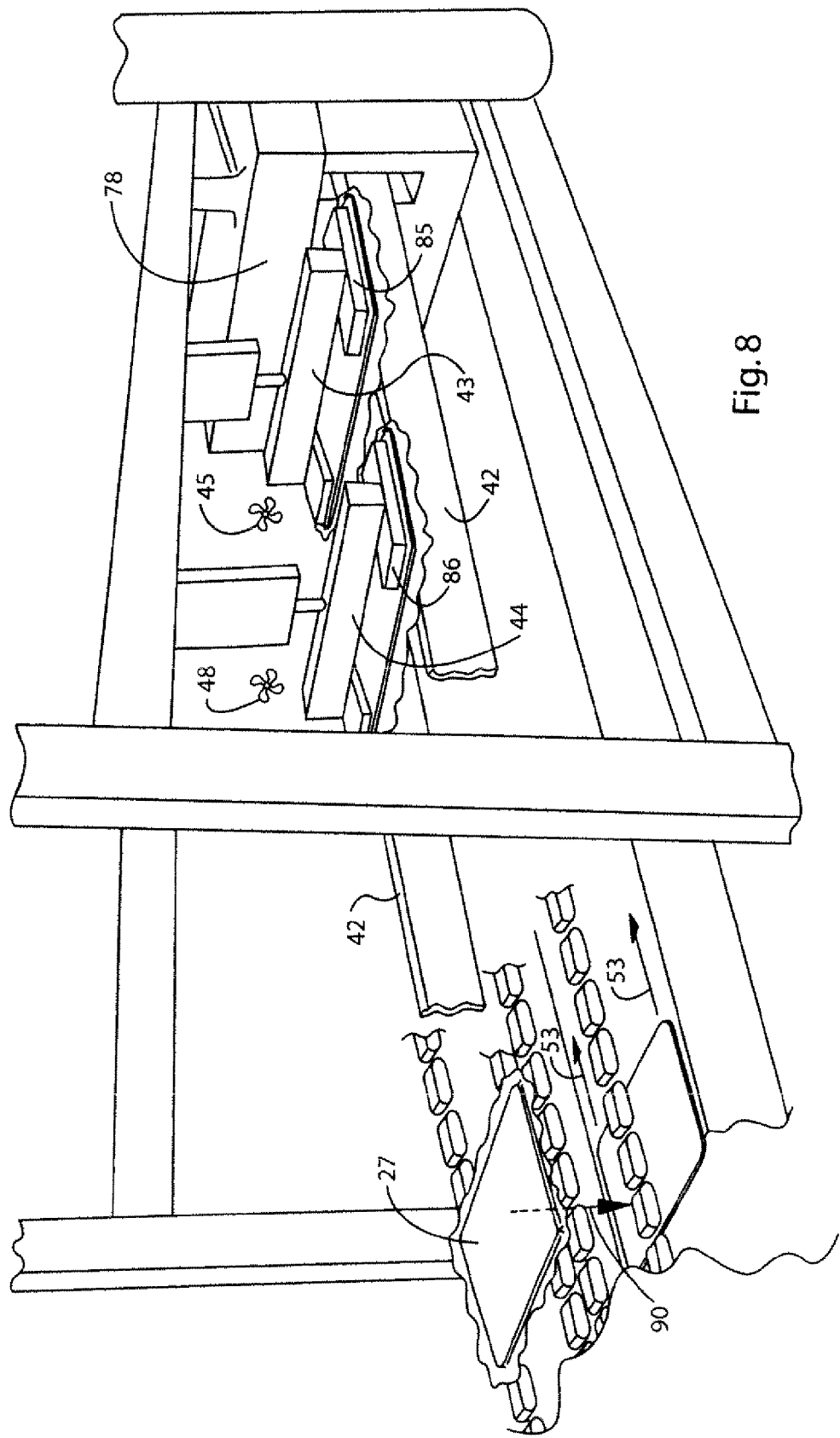

FIG. 8 is an enlarged fragmentary schematic illustration of a portion of the walking beam mechanism of FIG. 1 taken from the opposite side of the illustration of FIG. 1 for receiving carrier plates with shingles thereon that are received from the compression mold and with hold-downs being illustrated for movement with the carrier plates via the walking beam, and with the carrier plates with shingles thereon having flashing shown along edges thereof, and with the downward discharge of the carrier plates to the return conveyor of FIG. 2.

Figure 9:
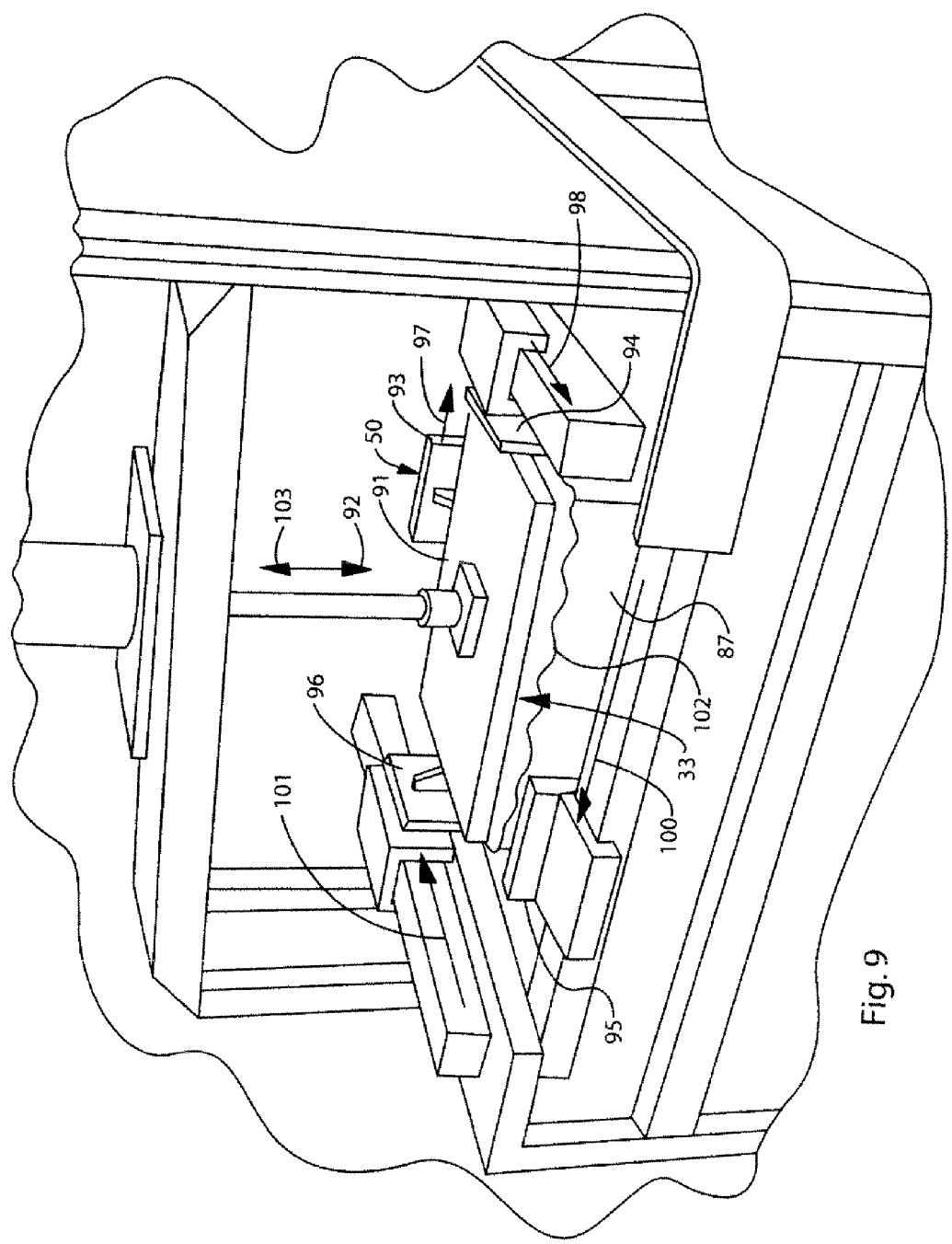

FIG. 9 is an enlarged fragmentary schematic illustration of the cutting mechanism for simultaneously cutting flashing from the molded shingles that are situated on secondary plates in the cutting mechanism.

Figure 10:
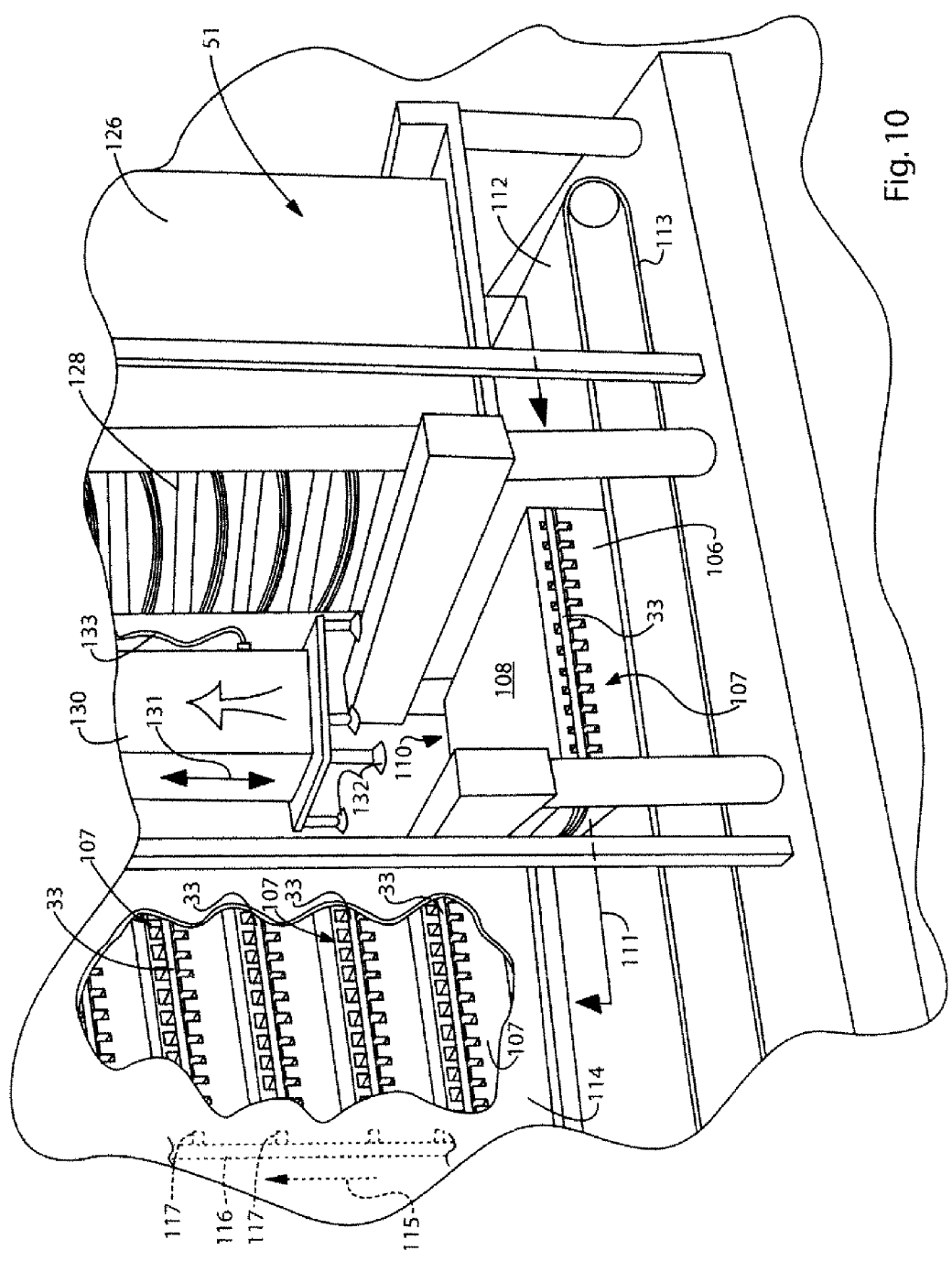

FIG. 10 is a fragmentary schematic view of a cooling tower for receiving a plurality of shingles therein at a station in which the shingles are loaded into a shingle retention mechanism for applying curvature thereto, and wherein the shingles in the mechanism are then delivered up one (left) portion of the cooling tower, and down another (right) portion of the cooling tower, back to the loading station, from which they are unloaded, with a portion of one of the tower portions being broken away for clarity.

Figure 11:
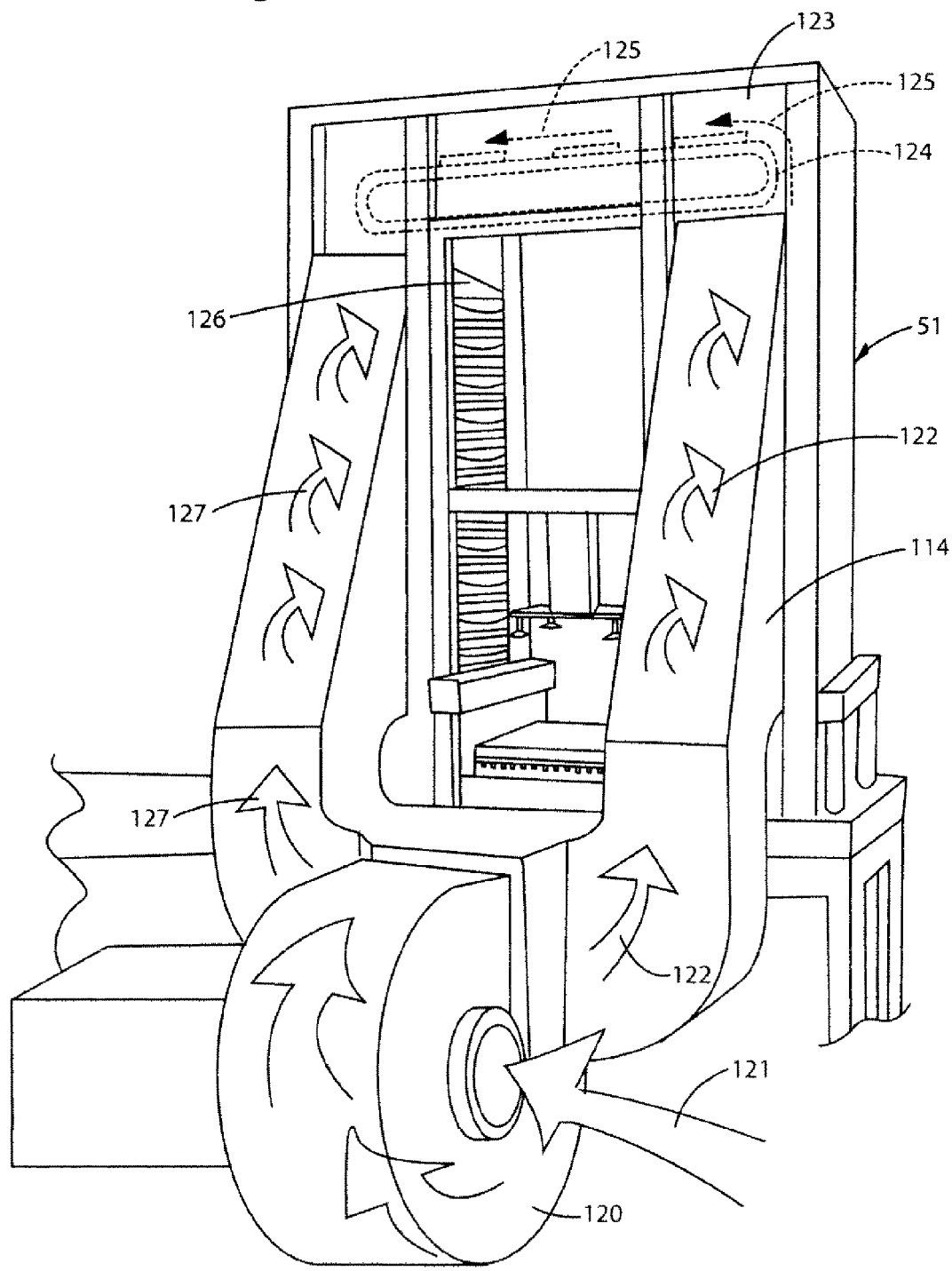

FIG. 11 is a schematic perspective rear view of the shingle cooling tower partially illustrated in FIG. 10, taken from the opposite side illustrated in FIG. 1.

Figure 12:
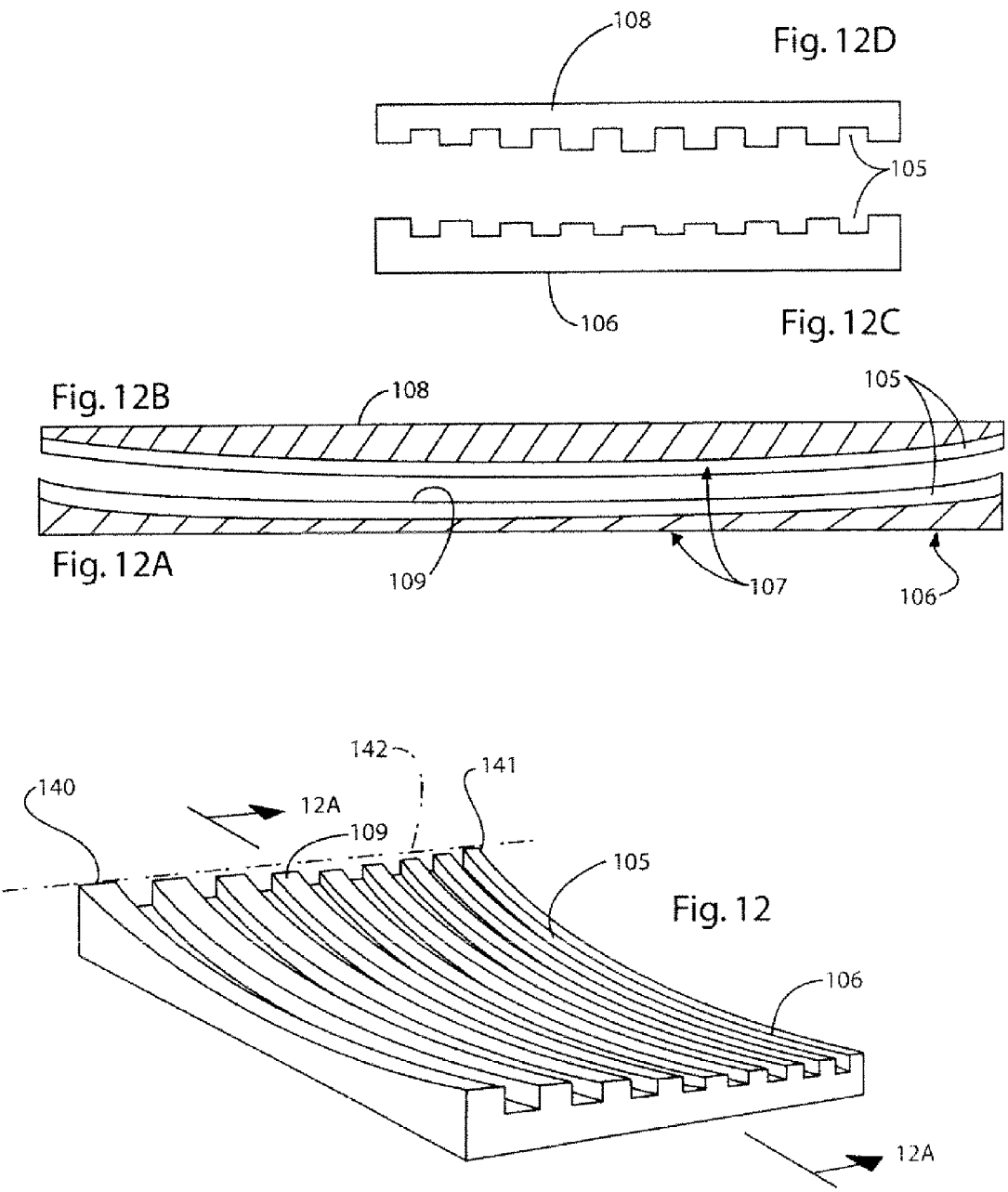

FIG. 12 is a perspective view of one form of a lower component of the retention mechanism, adapted to receive a shingle therein, on its curved upper surface, and with fluid cooling grooves being shown in that lower component of the retention mechanism.

FIG. 12A is a longitudinal sectional view, taken through the lower component of the shingle retention member illustrated in FIG. 12, generally along the line 12A-12A of FIG. 12.

FIG. 12B is a longitudinal sectional view taken through an upper component of the shingle retention mechanism, and wherein the opposing faces of the lower and upper components 12A, 12B of the retention mechanism are illustrated as being respectively concave and convex, for applying a curvature to shingles sandwiched therebetween.

FIGS. 12C and 12D are end views of the shingle retention components of FIGS. 12A and 12B, respectively.

Figure 13:
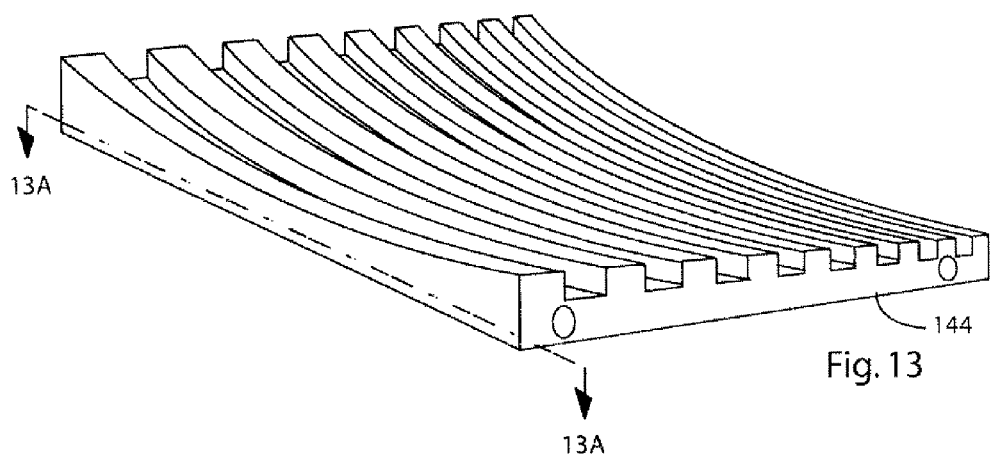

FIG. 13 is a schematic top perspective view of an alternative embodiment arcuately configured lower shingle retention component.

Figure 13A:
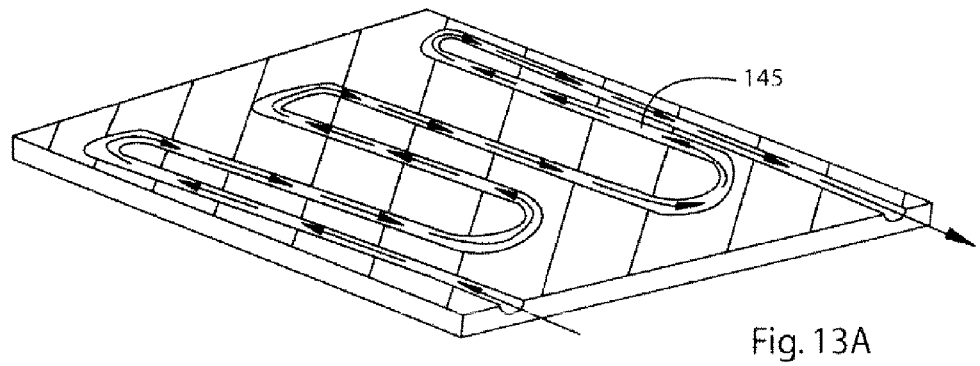

FIG. 13A is a sectional view of the lower shingle, retention component of FIG. 13, taken generally along the line 13A-13A of FIG. 13.

Figure 14:
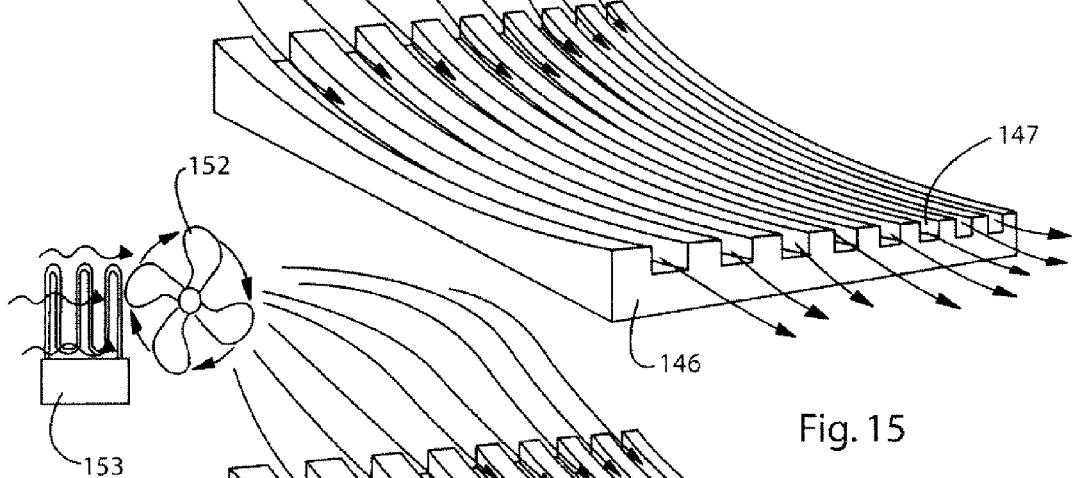

FIG. 14 is a schematic top perspective view of another embodiment of a lower shingle retention component, having a fan type cooling mechanism disposed for blowing cooling fluid through grooves of the component of FIG. 14.

Figure 15:
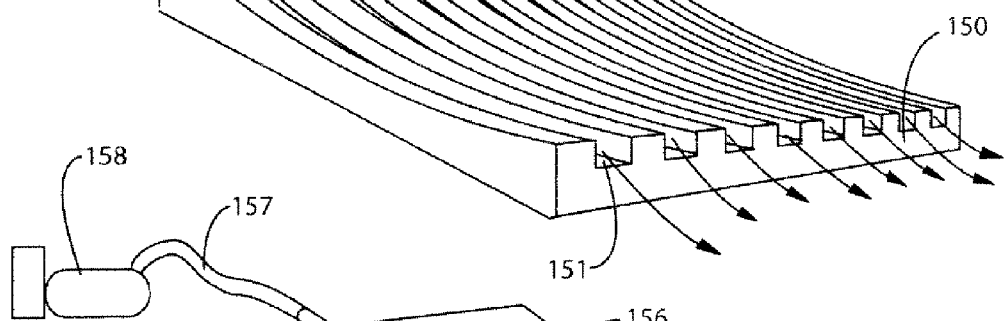

FIG. 15 is a schematic top perspective view similar to that of FIG. 14, but wherein the fan device for cooling is provided with a refrigerant or like cooling device for cooling ambient air for the fan type cooling mechanism.

Figure 16:
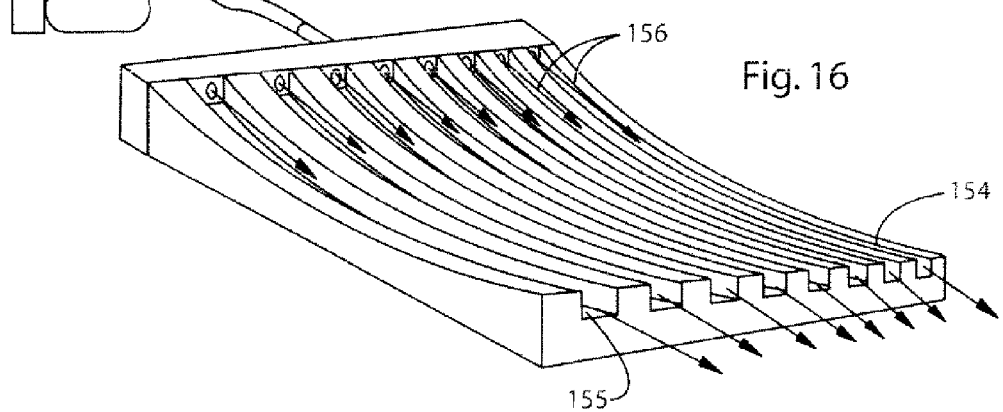

FIG. 16 is a schematic top perspective view of yet another alternative embodiment of a lower shingle retention component in which a coolant other than ambient air is used to cool shingles via grooves therein.

Figure 17:
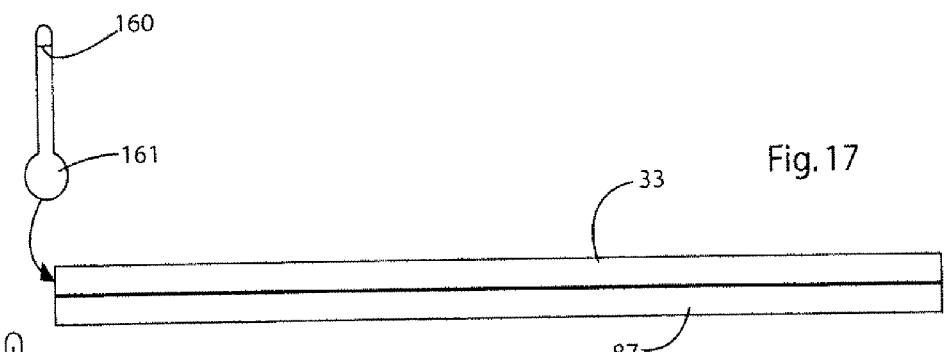

FIG. 17 is a schematic side elevational view of a shingle that is disposed on a secondary plate, following the cutting or flashing trimming operation of FIG. 9.

Figure 18:
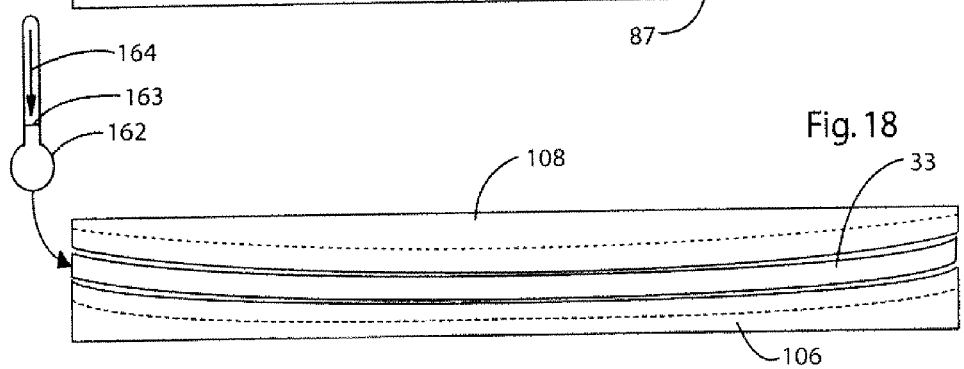

FIG. 18 is a side elevational view of a shingle shown disposed between upper and lower retention components, after cooling of the shingle, while it is still disposed between upper and lower retention components, just prior to it being removed from the unloading station illustrated in FIG. 11.

Figure 19:
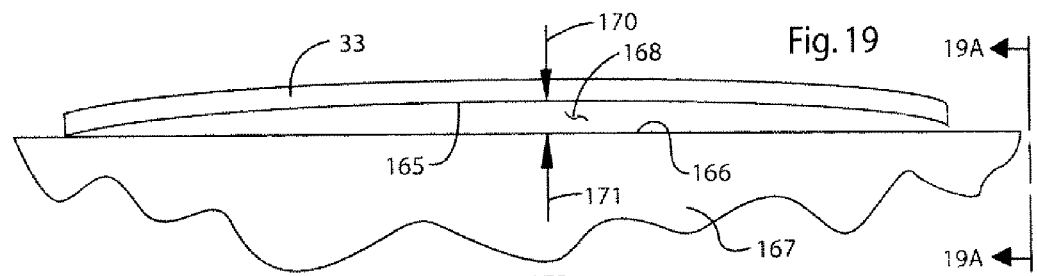

FIG. 19 is a side elevational view a shingle being applied to a roof, prior to fastening the same against the roof, showing the curvature that has been applied to the shingle in the retention mechanism, with the roof being fragmentally illustrated.

Figure 19A:
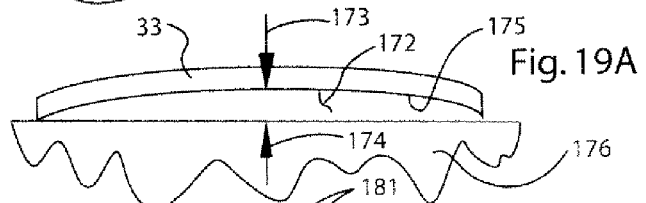

FIG. 19A is a view taken of the shingle and a fragmentary portion of a roof as shown in FIG. 19, but along the line generally shown as 19A-19A of FIG. 19.

Figure 20:
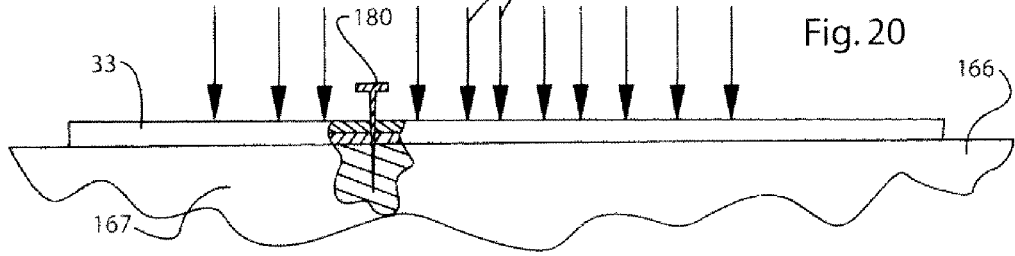

FIG. 20 is an illustration similar to that of FIG. 19, but wherein the shingle is shown being fastened down tightly against the roof, by a fastener.

DETAILED DESCRIPTIONS OF THE PREFERRED EMBODIMENTS

Figure 5:
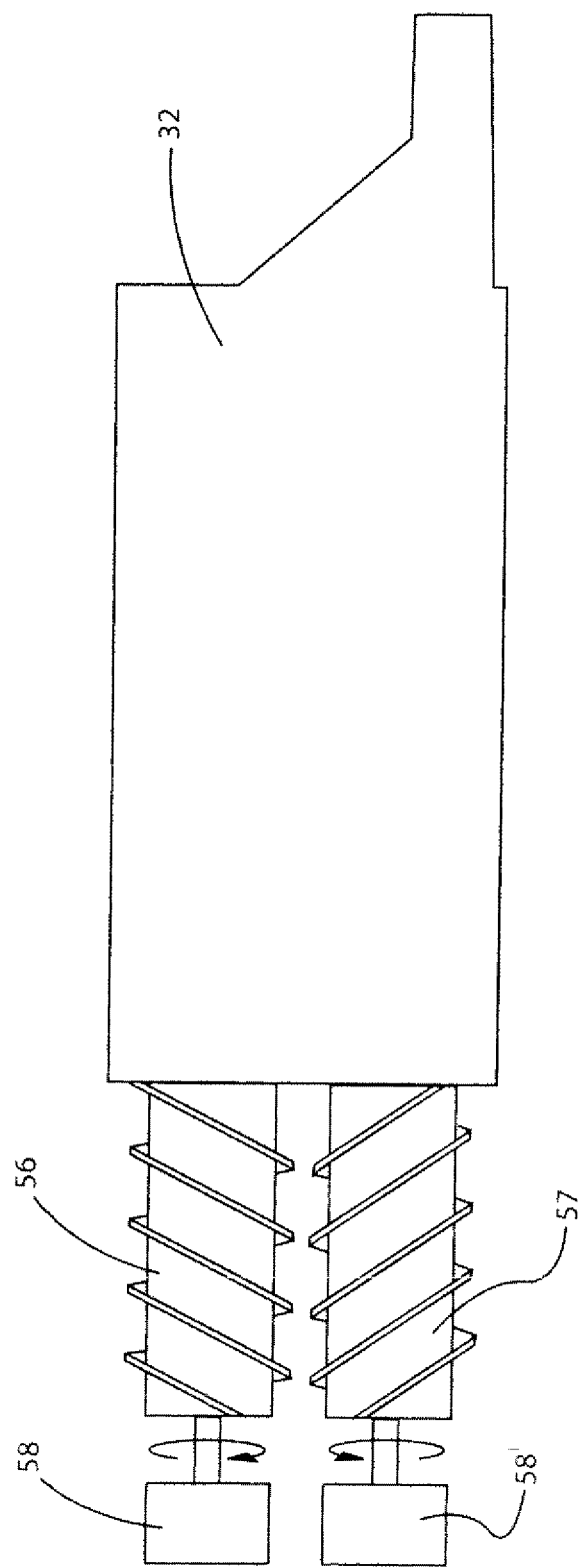
FIG. 5 is a schematic side elevational view of the two single screw extruders of FIGS. 1 and 4.

Referring now to the drawings in detail, reference is first made to FIG. 1, wherein the apparatus of this invention is generally designated by the numeral 25 as comprising a preliminary conveyor apparatus 26 for delivering carrier plates 27 through a carrier plate preheater apparatus 28, as shown in perspective view in FIG. 3, whereby the carrier plates are delivered via a transfer mechanism 30 to an extruder conveyor apparatus 31 between rotatable end shafts 12, 13, whereby the carrier plates are delivered beneath an extruder apparatus 32, shown in larger view in FIG. 5, of the type preferably having a pair of single screw extruders 56, 57, by which a co-extruded sheet of shingle material 33, preferably comprised of a core material 34 covered by a layer of capstock material 35 is co-extruded onto the carrier plates 27, as is shown more clearly in perspective view in FIG. 4, and the carrier plates are delivered end-to-end therebeneath, as shown in FIG. 1.

The carrier plates with the shingle material 33 thereon are then delivered past a severing mechanism 36, for severing the shingle material at an end 38 of a carrier plate.

The carrier plates 27 are then delivered to a speed-up conveyor 40, at which the carrier plates are serially separated one from the other, for serial delivery to a compression mold 41.

A walking beam type transport mechanism 42 lifts the carrier plates from the conveyor mechanism 40, into the compression mold 41 and subsequently out of the compression mold 41, to be transferred by the walking beam mechanism 42 to a series of hold-down stations 43, 44, each of which have associated cooling devices 45, 46 for cooling down the still soft, compression molded shingles. The carrier plates 27 are then transferred downwardly, as shown by the 90 from the conveyor 40, back to the return conveyor 26, for re-use.

It will be understood that the extruders 56, 57 could feed multiple compression molds 41, such as anywhere from two to four compression molds, in some desired sequence, via a plurality of speed-up conveyors 40, if desired, or in any other manner, and in some operations such could be a preferred embodiment.

A transfer mechanism 47, which may be of the robot type, is provided for lifting a molded shingle 48 from its carrier plate 27, and delivering the shingle 48 to a severing station 50 for removing flashing therefrom. At the severing station 50, the shingle 48 is placed onto a secondary plate where blades will trim flashing from the various edges thereof, as will be described more fully hereinafter.

The robotic or other type of mechanism 47 will then remove the shingle from the Clash trimming station 50 and deliver it to a cooling station 51 as will also be described in detail hereinafter, and wherein the shingle is cooled down to ambient temperature, and preferably provided with a curvature therein.

At the left lower end of FIG. 1, it will be seen that a representative mechanism 30 illustrates the manner in which carrier plates 27 can be delivered from the upper run of the conveyor mechanism 26, which conveyor mechanism is moving in the direction of the arrows 52, 53, to lift the carrier plates 27 upwardly in the direction of the arrows 54, to place the same onto the upper run 39 of the conveyor 31, which conveyor 31 is being driven to move its upper run in the direction of the arrows 55, 59.

With the carrier plates 27 being moved rightwardly with the upper run of the conveyor 31 as shown in FIG. 1, to pass beneath the co-extruder 32, it will be seen that a pair of single screw extruders, 56, 57, being motor driven by motors 58, 58', produce a multi-layer extrudate comprising a core layer 34 and a capstock layer 35 of soft, semi-molten shingle material 33 onto a series of carrier plates 27 that are passing beneath the extruder 32, end-to-end, as shown in FIGS. 1 and 4, for example.

With reference to FIG. 2, it will be seen that the preheater 28 can be provided with any suitable means 60 for preheating the carrier plates 27 as they pass therethrough. The heating means 60 can be electric heating means, a heated fluid passing through a pipe or tube, an infrared heater, a microwave heater, or of any other suitable means, such as a hot air blower, or combination of means if desired.

In FIG. 2A an alternative embodiment of a preheater 28' is provided, wherein carrier plates 27' are delivered leftward along a preferably steel plate 29' (fragmentally shown) with heating elements 60' disposed therebeneath for heating the plate 29' for transferring heat to the carrier plates 27'. The carrier plates are moved along the plate 29' by movable brackets 9' of angle iron or other types, in the direction of arrow 8', which are driven from the opposite side of the preheater 28' to that shown in FIG. 2A by a conveyor chain 26' (fragmentally shown), in turn driven by sprockets 51' at ends thereof, turning in the direction of the arrow 52'. A transfer mechanism 30' (shown in phantom), like the transfer mechanism 30 of FIG. 2, lifts the carrier plates 27' upwardly at the left end of the preheater 28' to pass beneath the extruder 32. The heating elements 60' can be any of the heating means described above for the embodiment of FIG. 2. Supplemental heating elements (not shown) can also be used, and they can be infrared elements, quartz lamps or any other means for heating the plate 29' or the carrier plates 27'.

With reference to FIGS. 2B and 2C, it will be seen that the carrier plates 27 will each have an upper surface 61, preferably, with a plurality of grooves 62, 63, 64, etc. and preferably fastening zones 65, molded therein, configured to be the reciprocal of the configuration of the underside of shingles to be formed thereon, such that the undersides of the shingles will have their shingle material entering the grooves 61-64 and fastening zones 65, to provide suitable spacing ribs and fastening zones (not shown) for the undersides of shingles to be formed on the carrier plates 27, with the ribs serving to support shingles mounted on roofs. Alternatively, the carrier plates could be solid, if desired. Also, alternatively, other features may be provided on the upper surfaces of carrier plates 27 to impart reciprocal features to the shingles molded thereby.

With specific reference to FIG. 2C, it will be seen that the carrier plates 27 may have locating pin holes 66, to facilitate the proper placement of the carrier plates 27 over pins 67 as shown in FIG. 1 in the bottom 68 of the compression mold 41, when the carrier plates are delivered to the compression mold 41, for proper and precise location of the carrier plates 27 in the compression mold 41.

Figure 6:
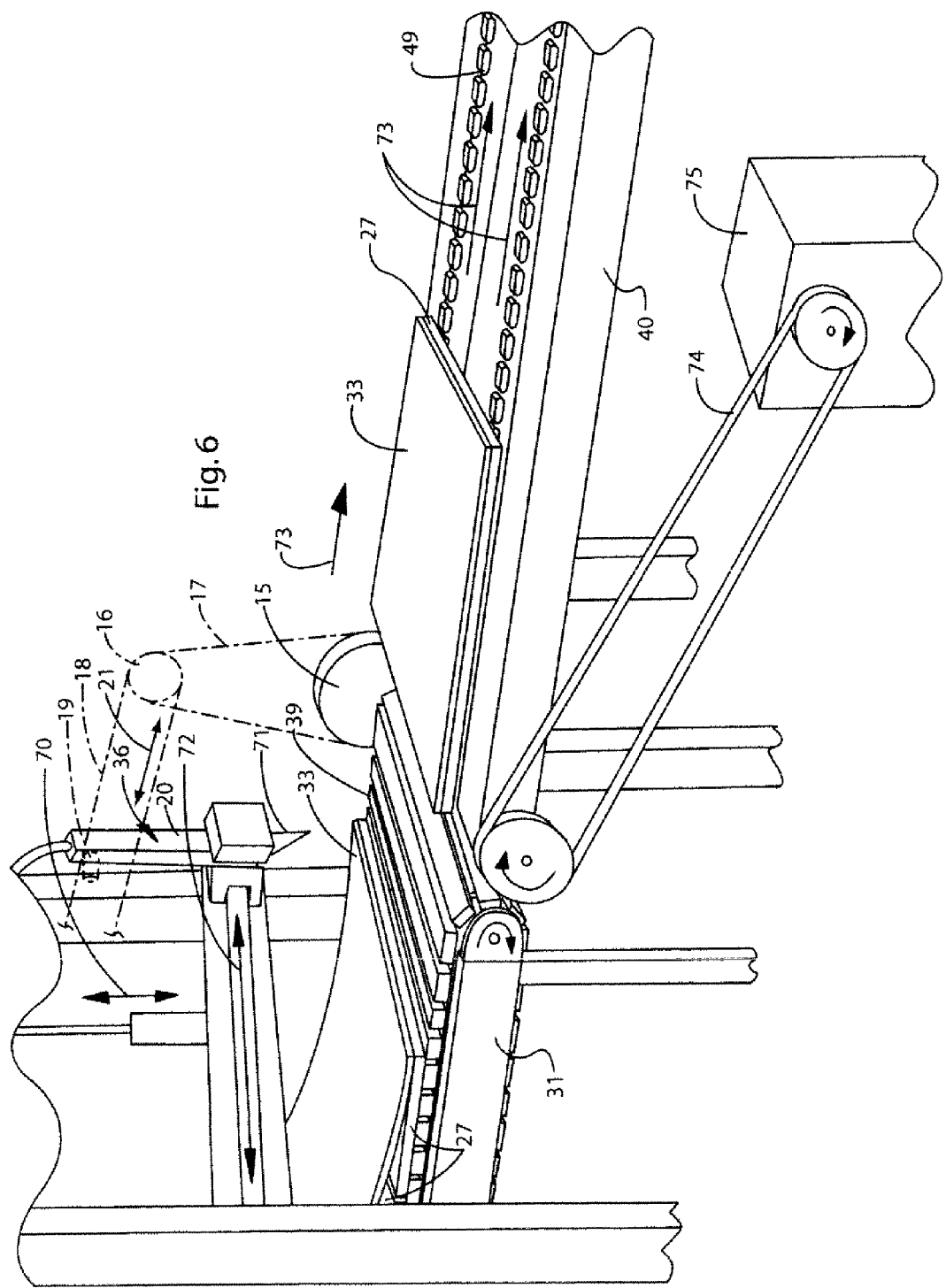
FIG. 6 is an enlarged fragmentary schematic illustration of the mechanism for severing shingle material being extruded onto carrier plates, and a means for thereafter separating the individual carrier plates with shingle material thereon, from each other.

With reference now to FIGS. 1 and 6, the placement of the extrudate 33 onto a serially arranged and touching number of carrier plates 27 is illustrated at the outlet of the extruder, as is the severing mechanism 36 by which the shingle material 33 is serially severed at each endwise location of a carrier plate.

The severing mechanism 36 operates such that it can be lowered or raised as indicated by the direction of the double headed arrow 70 shown in FIG. 6, with a severing blade 71 thereof being moved transversely of the upper run 39 of the conveyor 31, in the direction of the double headed arrow 72, to traverse the conveyor upper run 39, to sever the shingle material 33 as shown in FIG. 6, to overly each carrier plate 27.

The severing mechanism 36 may optionally be longitudinally moveable in correspondence with the longitudinal movement of the carrier plates, as shown in phantom in FIG. 6, via a pulley or the like 15, rotating in unison with shaft 12, and in turn, driving a belt or chain 17 that in turn, is driving a shaft 16 that drives a longitudinal conveyor 18 connected at 19 to a post 20 of the severing mechanism 36, so that the mechanism 36 is longitudinally movable in the direction of the double headed arrow 21. This enables tracking of the severing mechanism 36 with the progress of the carrier plates 27 along the conveyor system, so that the precision of the cut is maintained.

Following the severing by the mechanism 36, the conveyor 40 is driven such that its upper run 49 moves in the direction of the arrow 73, at a faster rate than the upper run 39 of the conveyor mechanism 31, such that the carrier plates 27 become separated from each other.

The conveyor upper run 49 may be driven in any suitable manner, such as being belt driven as at 74 from a motor 75, or in any other manner, as may be desired.

Optionally, a plurality of extruder apparatus 32 and severing mechanisms 36 may, if desired, be used to supply extruded shingle material 33, disposed on carrier plates 27, to any selected ones of a plurality of compression molds 41, as may be desired.

Figure 7:
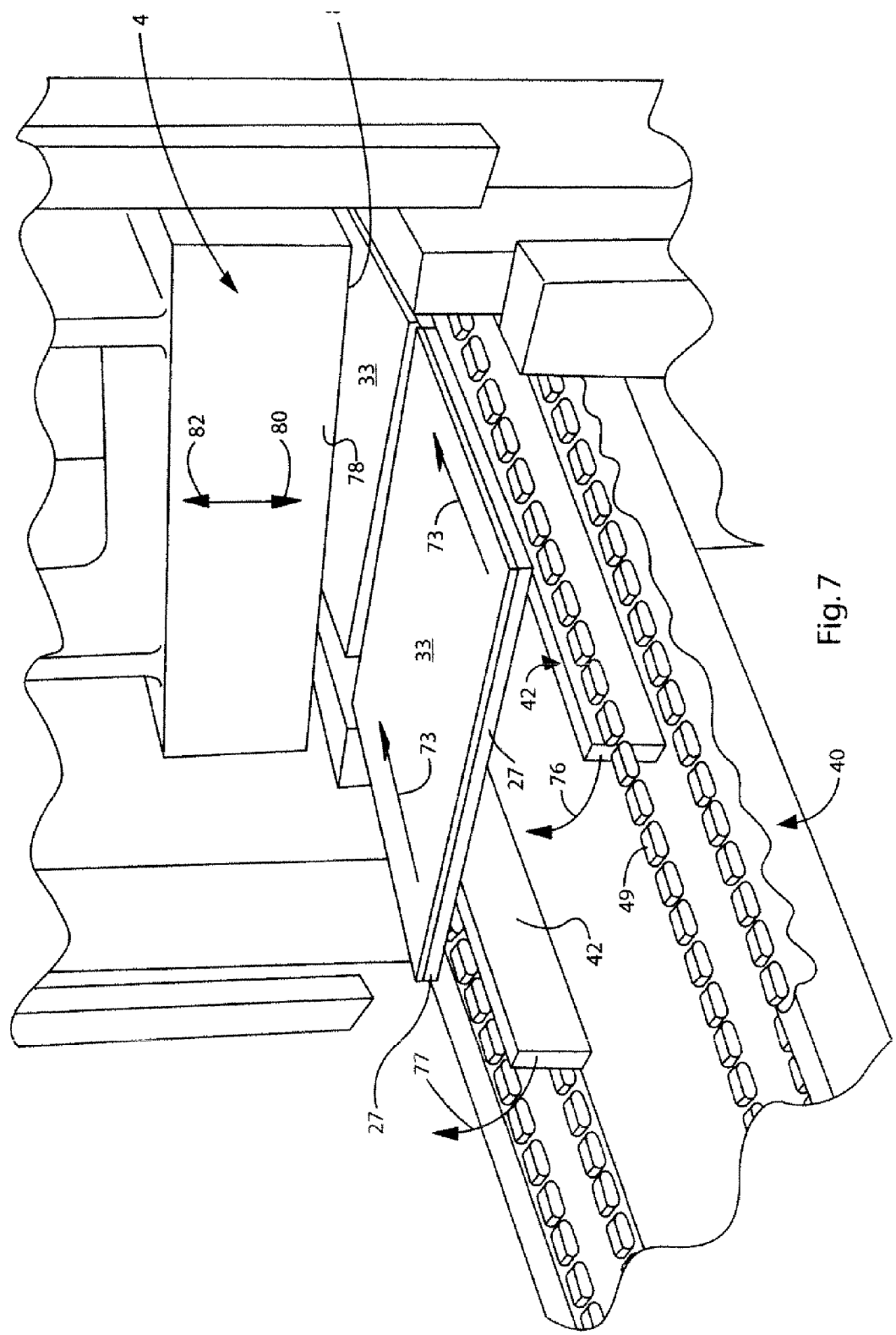
FIG. 7 is an enlarged fragmentary schematic illustration of a mechanism of the walking beam type, for receiving carrier plates with shingle material thereon and delivering them to a compression mold.

With reference now to FIGS. 1 and 7, it will be seen that the carrier plates 27 with their shingle material 33 applied thereto are delivered along the upper run 49 of the conveyor mechanism 40, to the walking beam transport mechanism 42, which is operated to be lifted upwardly as shown by the arrows 76, 77, to lift the carrier plates 27 into the compression mold 41, to place the carrier plates 27 onto a base mold portion 68 thereof, by which the pin recesses 66 (FIG. 2C) may be engaged by upstanding pins 67 in order to properly secure the location of the carrier plates and the shingle material 33 thereon in the compression mold 41. Thereafter, the upper die portion 78 of the compression mold 41 is moved vertically downwardly in the direction of the arrow 80, such that its lower surface 81, being configured to have a reciprocal surface configuration to that that is desired for the upper surface of the shingle that is to be molded on the carrier plate 27, engages the shingle material 33 under a predetermined pressure to force the shingle material 33 to conform to the reciprocal of the surface configuration 81 of the die 78, and thereafter, the die 78 is moved upwardly in the direction of the arrow 82 of FIG. 7 such that the then molded shingle is ready for discharge from the compression mold 41. The use the carrier plates enables supporting the shingle material for a shorter time in the compression mold than if the shingle material had to be released from the mold when it is inure solidified and therefore more self-supporting.

A lifting motion of the walking beam mechanism 42 then lifts the carrier plate 27 and the shingle 33 molded thereon from the compression mold 41 and sequentially delivers the same to the two hold-down stations 43, 44 as shown in FIGS. 1 and 8. At the hold-down stations 43, 44, the thus formed shingles and carrier plates are engaged by respective hold-down members 85, 86, and cooling air may be delivered via optional fans or the like 45, 46 to facilitate a partial cooling-down of the thus formed shingles.

After leaving the hold-down stations 44, the robot or other mechanism 47 or an operator (manually) picks up a thus-formed shingle off of its carrier plate 27, and delivers the same as shown by the full line and phantom positions for the robot mechanism 47 illustrated in FIG. 1, onto a secondary plate 87 (FIG. 9) of the flash-trimming mechanism 50.

With reference to FIGS. 1 and 9, the flash-trimming mechanism 50 is more clearly illustrated.

Upon separation of a thus-formed shingle 33 from its carrier plate 27, the carrier plate becomes disengaged from the conveyor mechanism 40, and drops down as shown by the arrow 90 in FIG. 1, to the upper run of the conveyor mechanism 26, for re-use.

Upon placement of the shingle on the secondary plate 87 in the flash-trimming mechanism 50, an upper plate 91 is brought vertically downwardly in the direction of the arrow 92, to engage the upper surface of the thus-formed shingle 33, such that four severing blades 93, 94, 95, 96, may simultaneously be moved along the edges of the secondary plate 87, in the directions of the arrows 97, 98, 100 and 101, respectively, to sever flashing 102 therefrom, after which the plate 91 is lifted upwardly in the direction 103, and the robot arm 47 or a different mechanism (not shown) or an operator (manually) engages the thus trimmed shingle 33 and removes it from the flash trimming station 50.

Alternatively, the severing blades 93-96 could be driven to flash-trim in directions opposite to directions 97, 98, 100 and 101, or both in the directions 97, 98, 100 and 101 and in directions opposite thereto, in back-stroke directions.

With reference to FIGS. 1, 10 and 11 more specifically, the apparatus and method for cooling the shingles thus formed in a cooling tower is more clearly illustrated.

As shown toward the right side of FIG. 1, particularly in phantom, the robotic arm 47 engages a shingle 33 from the trimming mechanism 50 and inverts the shingle, so that its upper face (which is the face that will be facing upwardly when installed on a root) is facing downwardly, delivering the same to the cooling tower 51. With reference to FIG. 10, the shingle 33 is then facing downwardly against a preferably ridged upper surface 105 of a lower component plate 106, as shown in FIG. 12 of a retention mechanism generally designated by the numeral 107. The retention mechanism 107 comprises a lower component plate 106 and an upper component plate 108, sandwiching the shingle between the plates 106 and 108. This occurs at a loading station 110 as shown in FIG. 10. The ridged surfaces 105 enable airflow for cooling. Other shaped surfaces that facilitate airflow for cooling could be used, as alternatives.

Alternatively, the shingles 33 could be engaged by their robotic arm 47 and not inverted, but placed between opposed plates 106, 108 that have downwardly curved opposing surfaces, opposite to those curved surfaces shown in FIGS. 12A and 12B.

After a shingle is thus sandwiched between upper and lower component plates 108 and 106 of the retention mechanism 107, the retention mechanism 107 is moved in the direction of the arrow 111 of FIG. 10, along the upper run 112 of a conveyor 113, to the left side 114 of be cooling tower mechanism 51 illustrated in FIG. 10. In the left side 114 of the cooling tower mechanism 51, a plurality of retention mechanisms 107 with shingles 33 carried therein are lifted vertically upwardly, in the direction of the phantom arrow 115, via an upward conveying device 116 having engagement lugs 117 carried thereby, during which cooling air delivered via a fan or the like 120 (FIG. 11) with ambient air being drawn into the fan in the direction of the arrow 121, passing upwardly in the direction of the arrows 122, and through the grooves of ridged surfaces 105 (FIGS. 12 and 12A-D) in the upper and lower component plates 108, 106 of be retention mechanisms 107, to cool the shingles 33 disposed therein.

After the shingles are conveyed fully upwardly through the left tower portion 114 of FIG. 10, to the upper end 123 thereof (FIG. 11), they are delivered across the top of the tower mechanism 51 via a suitable conveyor (shown in phantom) 124 or the like, in the direction of the arrows 125, to a downwardly conveying portion 126 of the cooling tower, wherein they are conveyed downwardly in a manner similar to that which they are conveyed upwardly in tower portion 114, so the same will not be duplicated by way of explanation herein.

During the downward passage of the retention mechanisms through tower portion 126, cooling air is likewise delivered from the fan 120, with ambient air being thus delivered to the shingles in the now downwardly moving retention mechanisms in tower portion 126, with air being supplied in the direction of the arrows 127.

At the loading station 110 illustrated in FIG. 10, a mechanism is provided for lifting the upper component plate 108 of each retention mechanism 107 both onto and away from a shingle 33 being carried by a lower component plate 106 of the retention mechanism 107. In doing so, a vertically movable lift mechanism 130 is provided, moveable upwardly and downwardly in the direction of the double headed arrow 131, with a plurality of feet 132 being carried thereby for engaging upper component plates 108, and a vacuum delivery line 133 is provided, such that as the feet 132 engage a plate 108, the vacuum is actuated and applied through the feet 132, so that upper component plates 108 of the retention mechanisms may be lifted from or placed downwardly onto a shingle 33, either for delivery to an upwardly lifting portion 114 of the cooling tower, or removing a upper component plate 108 from a shingle retention mechanism 107 after it is delivered downwardly via tower portion 126, in order to access a cooled shingle from a retention mechanism 107.

When the hot, soft, molded but partially molten shingles 33 are present between the curvature-inducing component plates, such as those 106, 108, and being cooled during their travel in cooling tower mechanism 51, as described above, the already-applied molded replication of natural slate texture, natural tile texture or natural wood texture is not affected or removed, because the forces that are applied to the plates 106, 108 in tower 51 are low enough to prevent removal of such texture. Also, the thermoplastic shingles are already sufficiently cooled solidified at their surface locations that such textures are already set, but internally the thermoplastic shingles remain sufficiently soft and hot enough to take on the set applied by the plates 106, 108 when cooled. By applying curvature to the shingles 33 in this manner, it allows use of flat carrier plates 27 and allows the use of mold shapes that are easier to work with and are generally less expensive than molds with the arcuate-forming shingle features built into the mold components 68 and 78.

While the movement of shingles 33 in the cooling tower while sandwiched between plates 106, 108 can be as described above, it will be understood that shingle movement through the cooling tower could alternatively be vertical, horizontal or any of various motions or combinations of motions, as may be desired.

With reference to FIGS. 12 and 12A, it will be seen that a lower component plate 106 of the retention mechanism has its upper surface 109 thereof, concavely configured as is most clearly illustrated in FIG. 12A. Similarly, the lower surface of the upper component plate 108, while being grooved as shown in FIGS. 12B and 12D complementary to the facing surface of the lower component plate 106, is convexly configured, as is clearly shown in FIG. 12B. Additionally, as shown in FIG. 12, the upper surface 109 of the lower component plate 106 is slightly dished, or concavely configured, from its left end 140 to its right end 141, as shown, and as may be more clearly seen by reference to the space between surface portions thereof and a straight phantom line 142 connecting said ends 140 and 141, to provide what is preferably a compound curved surface. The compound curve is adapted to prevent "smiling" of the tiles tinder weathering or thermal expansion conditions, where there is a capstock and core with different thermal expansion/contraction behaviors.

With reference now to FIGS. 13 and 13A, an alternative configuration is provided for a lower component plate 144 of a retention mechanism for sandwiching a shingle therebetween, for providing an alternative mechanism for cooling a shingle carried on the lower component plate 144. With reference to the section 13A-13A, it can be seen that a circuitous duct configuration 145 may be provided in the lower component plate 144, for receipt of a cooling medium, such as a refrigerant therethrough, if desired.

With reference to FIG. 14 another alternative means is provided for cooling a shingle carried on a lower component plate 146 having grooves 147 therein, in the form of a fan or the like 148 delivering a cooling air medium or the like through the grooves 147, as shown.

With reference to FIG. 15, an illustration similar to that of FIG. 14 is provided, but wherein a lower component plate 150 having grooves 151 therein is provided with cool air delivered via a fan 152 blowing from an air conditioning mechanism 153 or the like, for providing additional cooling over and above that which would be provided via ambient air, for a shingle carried on the lower component plate 150.

With reference to FIG. 16, it will be seen that yet another alternative embodiment of a lower component plate 154 is provided, wherein an alternative refrigerant or the like can be delivered via the grooves 155 in the plate 154, in the direction of the arrows 156, such coolant being a refrigerant or the like delivered via a line 157, provided via a coolant tank 158 or the like.

With reference to 17, there is a representation of a shingle 33 carried by a secondary plate 87, prior to it being delivered to a cooling tower, in which a diagrammatic thermometer representation is shown at the left end, indicating that the temperature of the shingle 33 is still at a relatively high level as shown by the temperature indicia 160 for the thermometer 161 thereof.

With reference to FIG. 18, it will be seen that the shingle 33, upon leaving the cooling tower illustrated in FIG. 10, and being delivered to the station 110, has been cooled down, such that the diagrammatic representation of a thermometer 162 shows that the temperature level 163 indicated thereon has been reduced substantially as indicated by the arrow 164, so that the shingle is now fully formed and cooled, and substantially rigid in nature.

With reference to FIG. 19, there is a diagrammatic side view representation of the shingle 33 with its downward-facing concave surface 165, facing an upper surface 166 of a roof 167, prior to being fastened to the root, showing a spacing 168 between opposing arrows 170, 171, such that the bottom surface of the shingle 33 is slightly arched and concave above the roof 167, providing a top-to-bottom arch.

With reference to FIG. 19A, it will be seen that, in an end view, the shingle 33 is dished in end view, as shown by the spacing 172 between the arrows 173, 174, with the bottom surface 175 of the shingle being slightly arched and concave above the roof 176, providing a right/left arch.

With reference to FIG. 20, it will be seen that the shingle 33 is shown fastened down against the upper surface 166 of the roof 167, by means of one or more fasteners 180, that draw the shingle tightly against the roof in the direction of the several arrows 181, for secure fastening of the shingle 33 flatly against the surface 166 of the roof 167.

A benefit of the curvature shown at surface 175 for the shingle 33 of FIG. 19A is that when fasteners such as those 180 are applied as shown in FIG. 20 and the shingle 33 engages against the surface 166 of a roof, the built-in memory of the shingle 33 of its shape as shown for example in FIG. 19A, resists upward edge curl or "smile" that may otherwise result from thermal expansion, weathering, aging or stress relaxation of the shingle. Thus, the curvature of the shingle as shown in FIG. 19A, for example, makes the contact of the shingles with the roof more secure.

It will be understood that in many instances the means for effecting movement of the shingles, the carrier plates, and the like, from one station to the other, are schematically shown, without showing all possible details of conveyors, walking beams, etc., and that other equivalents for such mechanisms may be provided. Similarly, with respect to the robot illustrated in FIG. 1, it will be understood that such mechanisms with varying extents of automation are available in the various mechanical arts, and can be used to mechanically move the shingle, carrier plates, and the like and that all equivalents of the same need not be disclosed herein.

Throughout this application, reference has been made to a "shingle", as being the item being molded, cooled, having curvature applied thereto, and the like, but it will be understood that broadly interpreted, "shingle", embraces also a "tile", a simulated "cedar shake", simulated other natural materials and the like.

The technology described herein can be applicable to other building products, especially where the building products are to be molded synthetic building materials. Such building materials could be synthetic roofing shingles, siding panels, molded accessories for fence, rail or deck applications, fence post caps, slates, shakes, tiles, panels, architectural trim, or textured ceiling panels or tiles. The carrier plates as described herein could be used for various such kinds of products. Similarly, the process as described herein may be applicable for providing an alternative to other types of molding techniques, such as injection molding techniques. With respect to some of these products, it may be desirable to add certain chemical features, such as fire resistance or lire retardant features, by adding materials that lend themselves to such features. For larger panels, it will be possible to include during the molding process, a means for attachment of panels to each other and the building structure, as a building cladding, by using such attachment features as locks, snaps, or the like. Also, the carrier plates of this invention can enable molding of more than one part at a time. A common carrier plate could be provided with a thermoplastic material, and two or more molds could close in on the carrier plate, sandwiching the thermoplastic material therebetween, to make two or more parts simultaneously. Additionally, various sized tiles or shingles could be made on a single carrier plate. The process as described herein may be used for making either flat panels, or sheet, as well as tiles and shingles, from polymers as an alternative to injection molding, particularly where at least one side of the product is to have a texture emulating a natural material. The use of carrier plates as described herein can shorten the cycle time required for molding, by removing heat from partially molten material. The temperature of the carrier plate can reduce the material temperature and the charge or thermoplastic material can be reduced somewhat in temperature while the thermoplastic material is on the carrier plate, before it is molded. Also, cooling of the material can facilitate a shorter cycle time. Supporting the thermoplastic material that is to be molded on a carrier plate after molding can allow removal of the part from the mold sooner, also producing a shorter cycle time.

It will be apparent from the foregoing, that various modifications may be made in the details of construction, as well as in the use and operation of the process and apparatus of this invention, and in the details of shingle manufacture and carrier plate configuration, all within the spirit and scope of the invention as defined in the appended claims.

What is claimed is:

1. A process of molding synthetic roofing shingles, comprising the steps of:
   (a) supplying a series of carrier plates arranged end-to-end on a generally horizontally disposed moving device;
   (b) applying at least a single thermoplastic continuous layer of soft, partially molten shingle material onto a plurality of the end-to-end arranged carrier plates as the carrier plates are moved generally horizontally via the moving device;
   (c) serially severing the continuous layer of soft partially molten shingle material at ends of carrier plates and horizontally separating the carrier plates to be horizontally spaced apart and delivering the carrier plates with their applied shingle material to a compression mold by automatically lifting the carrier plates from the moving device and pinning them to the bottom of the compression mold;
   (d) compression molding the shingle material to a desired configuration while the shingle material is on a carrier plate in the compression mold; and
   (e) removing the carrier plates with their applied compression molded shingle material thereon from the compression mold.

2. The process of claim 1, wherein the supplying step of clause (a) includes providing carrier plates having predetermined surface configuration on surfaces thereof, that are to receive shingle material applied thereto, wherein the surface configuration of each plate corresponds to a reciprocal surface configuration of the surface of the roofing shingle to be molded thereagainst.

3. The process of claim 1, wherein the compression molding step of clause (d) includes engaging the shingle material with a mold surface having a predetermined surface configuration on a surface thereof, wherein the surface configuration of the mold surface corresponds to a reciprocal surface configuration of the surface of the roofing shingle to be molded thereagainst.

4. The process of claim 1, wherein the supplying step of clause (a) includes providing carrier plates having predetermined surface configuration on surfaces thereof, that are to receive shingle material applied thereto, wherein the surface configuration of each plate corresponds to a reciprocal surface configuration of the surface of the roofing shingle to be molded thereagainst, and wherein the compression molding step of clause (d) includes engaging the shingle material with a mold surface having a predetermined surface configuration on a surface thereof, wherein the surface configuration of the mold surface corresponds to a reciprocal surface configuration of the surface of the roofing shingle to be molded thereagainst.

5. The process of claim 1, wherein the removing step of clause (e) is accomplished while the shingle material is soft and partially molten.

6. The process of claim 1, wherein the delivering step of clause (c) is a serial delivering step.

7. The process of claim 1, wherein the applying step of clause (b) comprises extruding the partially molten shingle material serially onto the carrier plates.

8. The process of claim 1, wherein the applying step of clause (b) comprises co-extruding at least a two-layer lamination of soft, partially molten shingle material onto each carrier plate.

9. The process of claim 8, wherein the co-extruding step comprises co-extruding a layer of core shingle material and a layer of capstock shingle material.

10. The process of claim 1, including the step of preheating the carrier plates prior to the applying step of clause (b).

11. The process of claim 1, wherein the applying step of clause (b) comprises continuously applying the at least a single thermoplastic layer as a unitary extrusion by extruding it onto a series of carrier plates that are serially delivered beneath the extrusion, and then severing the unitary extrusion of the at least a single thermoplastic layer between each carrier plate, whereby each carrier plate carries its own shingle material.

12. The process of claim 1, wherein the delivering and removing steps of clauses (c) and (e) comprise lifting the carrier plates with their applied shingle material thereon into and out of the compression mold.

13. The process of claim 12, wherein the lifting of the carrier plates out of the compression mold with their applied shingle material thereon includes sequentially moving the carrier plates with their applied shingle material thereon through at least one position downstream of said compression mold.

14. The process of claim 13, including the step of stabilizing the carrier plates with their applied shingle material thereon by sequentially engaging the shingle material by a vertically movable holder member while its associated carrier plate is stationary.

15. The process of claim 1, including the steps of separating the carrier plates from their applied shingle material and trimming shingle material flashing from edges of the shingle material.

16. The process of claim 15, wherein the trimming step includes placing the shingle material in a trimmer and simultaneously cutting the flashing from the shingle material by simultaneously trimming a plurality of sides of the shingle material.

17. The process of claim 1, including the step of cooling the shingle material to solidify the shingle material.

18. The process of claim 17, including the step of providing a shingle-material-engaging plate having a curved surface and having a plurality of grooves in the curved surface, and passing a cooling fluid through the grooves while retaining the molded surface configuration applied to the shingle material.

19. The process of claim 8, wherein the supplying step of clause (a) includes providing carrier plates having predetermined surface configuration on surfaces thereof, that are to receive shingle material applied thereto, wherein the surface configuration of each plate corresponds to a reciprocal surface configuration of the surface of the roofing shingle to be molded thereagainst, wherein the compression molding step of clause (d) includes engaging the shingle material with a mold surface having a predetermined surface configuration on a surface thereof, wherein the surface configuration of the mold surface corresponds to a reciprocal surface configuration of the surface of the roofing shingle to be molded thereagainst, wherein the removing step of clause (e) is accomplished while the shingle material is soft and partially molten, wherein the delivering step of clause (c) is a serial delivering step, including the step of preheating the carrier plates prior to the applying step of clause (b), wherein the co-extruding step comprises co-extruding a layer of core shingle material and a layer of capstock shingle material, whereby each carrier plate carries its own shingle material, wherein the delivering and removing steps of clauses (c) and (e) comprise lifting the carrier plates with their applied shingle material thereon into and out of the compression mold, including the steps of separating the carrier plates from their applied shingle material and trimming shingle material flashing from edges of the shingle material, and wherein the trimming step includes placing the shingle material in a trimmer and simultaneously cutting the flashing from the shingle material by simultaneously trimming a plurality of sides of the shingle material.

20. The process of claim 1, including the step of:
(f) applying a curvature to the molded synthetic shingle by the steps of:
  (i) supplying a support plate with a generally curved surface, for a shingle;
  (ii) placing a first surface of a soft, deformable shingle against the curved surface of the support plate;
  (iii) applying a force to an opposite second surface of the soft, deformable shingle; and
  (iv) cooling the soft, deformable shingle until it becomes substantially rigid, with its first surface substantially assuming the curved surface of the support plate.

21. The process of claim 20, wherein the supplying step of clause (i) includes providing a support plate with a plurality of surface grooves in the generally curved surface thereof, and then passing a cooling fluid through the grooves.

22. The process of claim 20, wherein the applying step of clause (iii) includes sandwiching the soft partially molten shingle between the support plate and an opposing plate.

23. The process of claim 20, wherein the cooling step of clause (iv) comprises delivering a plurality of the shingles and their support plates through a cooling zone and providing a cooling medium to the cooling zone.

24. A process of molding synthetic building material, comprising the steps of:
(a) supplying a series of carrier plates arranged end-to-end on a generally horizontally disposed moving device;
(b) applying at least a single thermoplastic continuous layer of soft, partially molten building material onto a plurality of the end-to-end arranged carrier plates as the carrier plates are moved generally horizontally via the moving device;
(c) serially severing the continuous layer of soft partially molten building material at ends of carrier plates and horizontally separating the carrier plates to be horizontally spaced apart and delivering the carrier plates with their applied building material to a compression mold by automatically lifting the carrier plates from the moving device and pinning them to the bottom of the compression mold;
(d) compression molding the building material to a desired configuration while the building material is on a carrier plate in the compression mold; and
(e) removing the carrier plates with their applied compression molded building material thereon from the compression mold.

25. The process of claim 24, wherein a plurality of building materials are simultaneously molded in the compression mold on at least one carrier plate.

\* \* \* \* \*

UNITED STATES PATENT AND TRADEMARK OFFICE
CERTIFICATE OF CORRECTION

| | | |
|---|---|---|
| PATENT NO. | : 8,574,481 B2 | Page 1 of 1 |
| APPLICATION NO. | : 11/994445 | |
| DATED | : November 5, 2013 | |
| INVENTOR(S) | : Thomas Kelvin MacKinnon et al. | |

It is certified that error appears in the above-identified patent and that said Letters Patent is hereby corrected as shown below:

In the Specification

Column 5, line 6, reads "remove the shingle from the Clash trimming station 50 and"
should read -- remove the shingle from the flash trimming station 50 and --

Column 7, line 54, reads "when installed on a root is facing downwardly, delivering the"
should read -- when installed on a roof is facing downwardly, delivering the --

Column 8, line 19, reads "component plates 108, 106 of be retention mechanisms 107,"
should read -- component plates 108, 106 of the retention mechanisms 107, --

Column 9, line 26, reads "to prevent "smiling" of the tiles tinder weathering or thermal"
should read -- to prevent "smiling" of the tiles under weathering or thermal --

Column 10, line 8, reads "roof 167, prior to being fastened to the root, showing a spac-"
should read -- roof 167, prior to being fastened to the roof, showing a spac- --

Signed and Sealed this
Thirty-first Day of December, 2013

Margaret A. Focarino
*Commissioner for Patents of the United States Patent and Trademark Office*